United States Patent Office 2,705,289
Patented Mar. 29, 1955

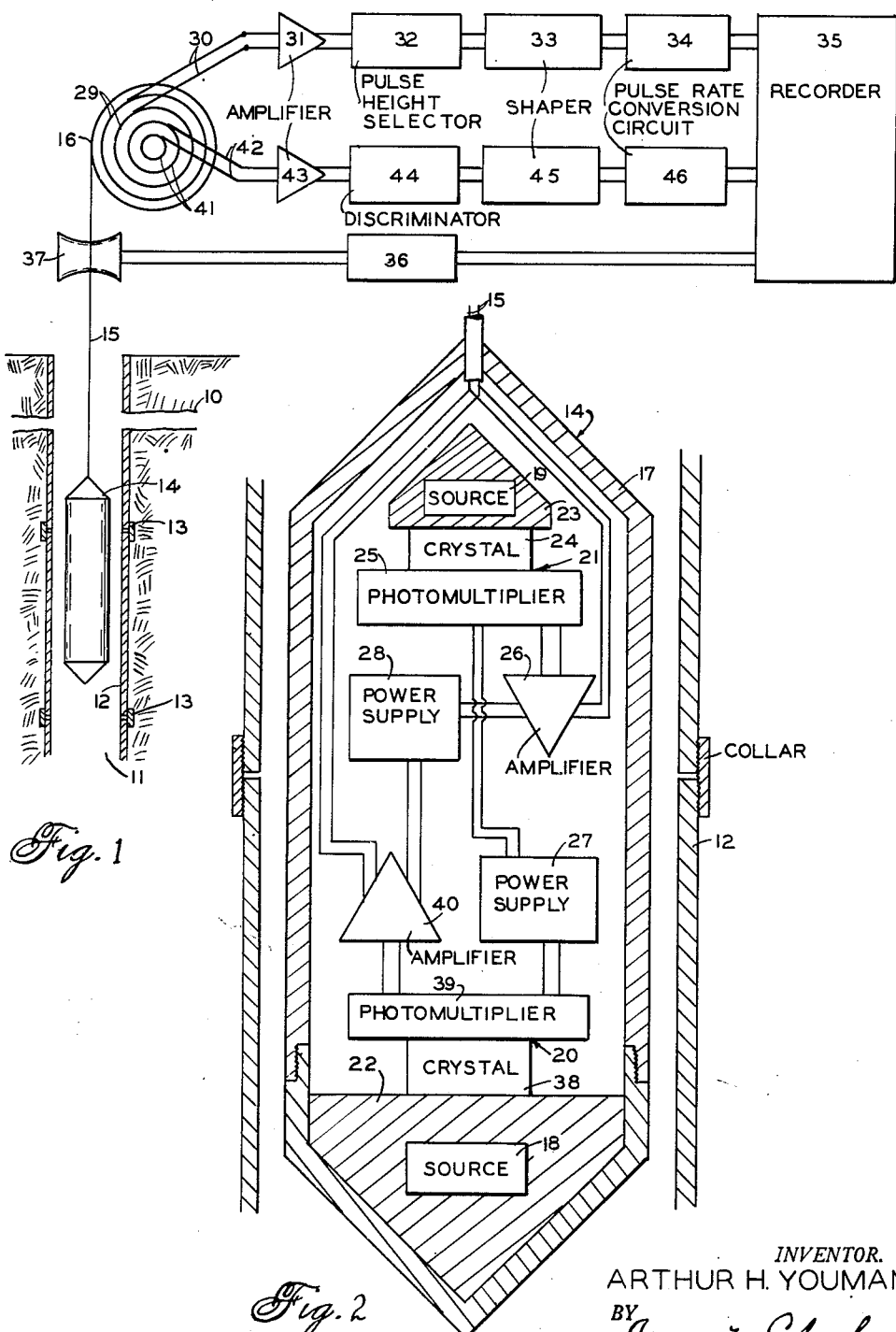

2,705,289

CASING COLLAR LOCATOR

Arthur H. Youmans, Tulsa, Okla., assignor to Well Surveys, Incorporated, Tulsa, Okla., a corporation of Delaware Application May 27, 1952, Serial No. 290,275

3 Claims. (Cl. 250—83.6)

This invention relates to the art of well logging and more especially to methods and apparatus for locating casing collars in a bore hole wherein the casing and casing couplings are bombarded with neutrons and gamma rays thereby produced are selectively detected.

The object of well logging is to obtain a record of measurements characteristic of the drill hole or of the formations surrounding a drill hole, on which record the measurements are correlated with the depth at which they were made. This correlation is ordinarily accomplished by driving the recorder by a measuring reel over which the logging cable is drawn. This correlation is not always accurate because of stretching of the cable or wearing of the cable or measuring reel. Therefore, it is desirable to use fixed markers in the well to indicate depth. Such markers are the steel couplings joining the sections of pipe which make up the well casing. These couplings may comprise steel sleeves or collars internally threaded to receive adjacent ends of casing sections, or they may be upset portions of the casing threaded for directly engaging adjacent sections. Throughout the remainder of this description, these couplings will be referred to as collars. In this invention the additional iron present at the casing coupling is detected and used for depth indication and correlation.

In performing radioactivity well logging, it is conventional to make neutron-gamma logs by bombarding the formations surrounding a drill hole with neutrons and detecting gamma rays thereby produced in the formations. In the instant invention, this has been adapted for selectively detecting the additional iron present at casing collars.

A source of neutrons is used to bombard the casing with neutrons. Slow neutrons are captured by the iron nuclei to form nuclei of another isotope of iron excited above their normal ground state. The nuclei so excited subsequently lose the excess energy by the emission of gamma rays having energies corresponding to the excitation energy levels of the iron atoms. Iron atoms may also be excited by fast neutrons by inelastic scattering of high energy neutrons. Gamma rays of a characteristic energy result from such scattering by iron. Selective detection of gamma rays having energies characteristic of iron will provide a measure of the relative amount of iron present, for the energies of gamma rays resulting from the capture or inelastic scattering of neutrons by iron nuclei, though different for the different processes because the nucleus is of a different iron isotope after neutron capture, are always the same for a given nucleus and are always different from gamma rays emitted by any other nucleus. The location of a casing collar is indicated by an increase in the number of gamma rays having energies characteristic of iron.

Upon neutron capture by nuclei of iron 56, excited nuclei of iron 57 are formed; thereupon gamma rays are emitted. These gamma rays have energies characteristic of iron 57; there are a number of energies characteristic of this process, although 5.2 m. e. v. is the most common energy greater than 3 m. e. v. Upon the excitation of iron 56 nuclei by inelastic scattering of fast neutrons, gamma rays having energies of 850 k. e. v. are characteristically emitted, although there are other characteristic energies.

In carrying out this invention it is necessary to use a detection system that permits spectrometric analysis of the gamma rays reaching the detector unit. This necessitates the use of a detector whose output is a function of the energies of impinging gamma rays. A scintillation counter is suitable, for the output pulses of a scintillation counter range in amplitude in accordance with the energies of impinging gamma rays. A discriminator or pulse height selector is used to sort out pulses of a size corresponding to gamma ray energies characteristic of iron.

This invention permits the identification of casing collars when a conventional radioactivity well-logging source of neutrons is used at the conventional source-to-detector spacing. The conventional source of neutrons is a radium-beryllium source containing 300–500 milligrams of radium mixed with beryllium. This source emits high energy neutrons which irradiate the formations surrounding a drill hole. Many of these neutrons emitted are slowed down by the well fluid and are captured by the iron in the casing, or they may be inelastically scattered by the iron nuclei. However, it is desirable to keep interactions in the well fluid and casing at a minimum in order that as many of the neutrons as possible may reach the formations. For the purposes of locating casing collars, the converse is true, and it is the neutron interactions in the casing which are desired to provide indications of casing collars. Thus, a superior source for casing collar identification is one which emits less energetic neutrons than a conventional source in order that the neutrons are more likely to be thermalized and captured in the casing or well fluid before reaching the formations. Such a source is an antimony-beryllium source, which emits 24 k. e. v. neutrons.

The conventional spacing of the source from the detector is usually large relative to the bore-hole diameter in order that effects of bore hole and casing may be minimized and the interactions in the formations may produce a maximum effect on the recorder. The converse effect is sought for the instant invention for the detection of casing collars. Consequently, although casing collars may be identified when conventional spacings are used, a closer spacing is preferable.

Therefore, the primary object of this invention is to provide a method and apparatus for accurately locating the position of casing collars in a bore hole. Another object is to provide a method and apparatus for selectively detecting gamma rays arising in iron when it is bombarded with neutrons. Still another object is to provide a method and apparatus whereby neutron-gamma ray logs and casing collar logs may be made with the same detector of radiation. Other objects and advantages of the present invention will become apparent from the following detailed description when considered with the accompanying drawings, in which:

Figure 1 is a diagrammatic illustration of a radioactivity well-logging operation including the location of casing collars; and Figure 2 is a vertical sectional view of the subsurface instrument.

Referring to the drawings in detail, particularly Figure 1, there is illustrated schematically a radioactivity well-surveying operation in which a portion of the earth's surface 10 is shown in vertical section. The well 11 is lined with a casing 12 conventionally made of uniform sections coupled by collars 13. The casing sections and collars are made of steel. Subsurface instrument 14 of the well-logging system is disposed within the casing. Cable 15 suspends the instrument in the well and contains the required conductors for electrically connecting the instrument with surface apparatus. The cable is wound on or unwound from drum 16 is raising and lowering instrument 14 to traverse the well.

As shown in Figure 2, the subsurface instrument 14 comprises a housing 17 which encloses neutron sources 18 and 19 and radiation detectors 20 and 21. If neutron sources 18 and 19 emit gamma rays as well as neutrons, it will be desirable to enclose sources 18 and 19 in high density gamma ray absorbers 22 and 23 formed of tungsten, lead, or any other high density material. Detector 20 is a radioactivity logging detector and detector 21 is a casing collar locator detector. Both are shown to comprise scintillation counters; however, the instant invention may be used with any radioactivity logging detector and indeed may be used with any logging system or even with none at all. To carry out this invention, the only requirement for detectors is that for the casing collar locator detector the output must be a function of the energies of impinging gamma rays. Neutron source 18 may be a conventional radium-beryllium source spaced from detector 20 by the conventional distance. Neutron source 19 is an antimony-beryllium source which emits less energetic neutrons in order that the neutrons be less penetrating; with less penetration by neutrons, neutron reactions in the casing are emphasized relative to reactions in the formations. The spacing between neutron source 19 and detector 21 is preferably less than conventional and may be as low as zero in order to emphasize casing reactions relative to reactions in the formations. Zero spacing and absence of gamma ray absorber 23 is practical, for gamma rays resulting from reactions with iron are selected by their energies and other gamma rays are eliminated from the recorded collar locator signal.

In making a casing collar log with this apparatus, instrument 14 is caused to traverse the well, whereby the bore hole, casing, and formations are bombarded with neutrons from source 19. These neutrons are captured or inelastically scattered by the nuclei of the bombarded material and gamma rays are thereby produced. The energies of these gamma rays are indicative of the elements from which they arise. Gamma rays indicative of iron largely arise in the casing 12, although many may arise within instrument 14 unless material other than iron is used in its construction. Even though iron be present in instrument 14, the number of gamma rays arising in the iron of the instrument and casing 12 is relatively constant as the instrument traverses the well; therefore the iron of casing collars 13 produces an increase in the number of gamma rays arising in iron as the instrument passes a casing collar.

In the practice of this invention, gamma rays strike crystal 24 of the scintillation counter detector 21. The crystal is made of material which responds to the radiation by producing photons of light which are transmitted through the crystal to photomultiplier 25 of the scintillation counter. Photomultiplier 25 converts these photons of light into pulses of electrons and amplifies these pulses. The resultant pulses are of amplitude dependent upon the energy of the incident gamma rays producing the respective electrical pulses. The resultant pulses may be further amplified by amplifier 26 and the amplified pulses sent to the surface through cable 15. Photomultiplier 25 is supplied with power by power supply 27. Amplifier 26 is provided with power by power supply 28. Although illustrated as a rectangle in the drawing, photomultiplier 25 is to be understood to include the necessary voltage divider and electric circuits for applying the required potentials to it. Additionally, it is to be understood that the power supplies 27 and 28 may be replaced by suitable transformers and rectifiers which may be supplied with power through the cable 15 from the surface of the earth.

Through slip rings 29 and brushes 30 at the end of the drum 16, conductors in the cable are electrically connected to amplifier 31 which in turn is connected to pulse height selector 32. Pulse height selector 32 passes pulses of a narrow range of heights to shaper 33. Pulse height selector 32 is adjusted empirically to pass only pulses of heights corresponding to pulses arising in detector 21 indicative of gamma rays having energies characteristic of iron. Shaper 33 shapes the pulses so that each pulse has the same effect as any other upon pulse rate conversion circuit 34. Pulse rate conversion circuit 34 functions in a conventional manner to produce a direct-current voltage that varies in magnitude in accordance with the rate of occurrence of pulses fed to it. The direct-current voltage is recorded by recorder 35, providing a record of the relative abundance of iron near detector 21 and hence of casing collars. Recorder 35 is driven through a transmission 36 by measuring reel 37 over which cable 15 is drawn so that recorder 35 moves in correlation with depth as instrument 14 traverses the well.

Casing collar locating is commonly performed in conjunction with another well service, radioactivity well logging, and such is shown in the drawings. In making a neutron-gamma ray log, the fluid in the drill hole, casing and surrounding formations are bombarded with neutrons from source 18. Gamma rays resulting from this bombardment are detected by detector 20 in the same manner in which detector 21 detected gamma rays. Detector 20 comprises crystal 38 and photomultiplier 39. The output pulses are amplified by amplifier 40, and the amplified pulses are sent to the surface through cable 15. The signals are led from the cable through slip rings 41 and brushes 42 and are further amplified by amplifier 43. Discriminator 44 eliminates small pulses arising from small random noises, principally noises in the photomultiplier. The pulses passed by discriminator 44 are shaped by shaper 45. Pulse rate conversion circuit 46 acts in a conventional manner to produce a direct-current voltage proportional to pulses produced by gamma rays in detector 20, which are large enough to pass discriminator 44. This direct-current voltage is recorded by recorder 35 as a function of the depth in the well at which the signals arise.

Although casing collar locator detector 21 is shown as comprising a scintillation counter, as explained above, it need only be a detector whose output depends upon the energies of incident gamma rays in order that output indicative of gamma rays from iron may be identified. Radioactivity logging detector 20 is not part of the invention, and any detector may be used, such as the conventional ionization chamber. Source 18 may be omitted, in which event casing collars are located in conjunction with a natural gamma ray log.

It is to be understood that this invention is not to be limited to the specific modifications described, but is to be limited only by the following claims.

I claim:

1. Apparatus for locating the position of iron casing couplings in a cased bore hole comprising an instrument housing adapted to be lowered and raised in a bore hole, an antimony-beryllium source of neutrons within said housing, a scintillation counter adjacent said source of neutrons and also within said housing, means for transmitting detection pulses from said scintillation counter to the surface of the earth, means at the surface of the earth for receiving said pulses, and means for selecting those pulses of amplitude indicative of gamma rays arising in iron, and means for deriving a direct-current signal proportional to the rate of occurrence of said selected pulses.

2. Apparatus for correlating the position of iron casing couplings in a cased bore hole with phenomena characteristic of the formations surrounding said bore hole that comprises an instrument housing adapted to be lowered and raised in a bore hole, an antimony-beryllium source of neutrons within said housing, a pulse type gamma ray detector adjacent said antimony-beryllium source of neutrons also within said housing, means for transmitting detection pulses from said gamma ray detector to the surface of the earth, means at the surface of the earth for receiving said pulses, means for selecting those pulses of amplitude indicative of gamma rays arising in iron, means for deriving a direct-current signal proportional to the rate of occurrence of said selected pulses, a radium-beryllium source of neutrons isolated from said first gamma ray detector and also within said housing, a radiation detector within said housing spaced from said radium-beryllium source of neutrons, means for transmitting the signals from said radiation detector to the surface of the earth, means at the surface of the earth for receiving said signals, a recorder on the surface of the earth, and means for simultaneously recording said derived signals and said radiation detector signals on said recorder.

3. Apparatus for correlating the position of iron casing couplings in a cased bore hole with phenomena characteristic of the formations surrounding said bore hole that comprises an instrument housing adapted to be lowered and raised in a bore hole, a source of neutrons having energies less than 0.5 m. e. v. within said housing, a pulse type gamma ray detector adjacent said source of neutrons having energies less than 0.5 m. e. v. also within said housing, means for transmitting detection pulses from said gamma ray detector to the surface of the earth, means at the surface of the earth for receiving said pulses, means for selecting those pulses of amplitude indicative of gamma rays arising in iron, means for deriving a direct-current signal proportional to the rate of occurrence of said selected pulses, a source of neutrons having energies greater than 0.5 m. e. v. isolated from said first gamma ray detector and also within said housing, a radiation detector within said housing spaced from said source of neutrons having energies greater than 0.5 m. e. v., means for transmitting the signals from said radiation detector to the surface of the earth, means at the surface of the earth for receiving said signals, a recorder on the surface of the earth, and means for simultaneously recording said derived signals and said radiation detector signals on said recorder.

References Cited in the file of this patent

UNITED STATES PATENTS

| | | |
|---|---|---|
| 2,445,305 | Hochgesang | July 13, 1948 |
| 2,469,460 | Fearon | May 10, 1949 |
| 2,481,014 | Herzog | Sept. 6, 1949 |
| 2,517,404 | Morton | Aug. 1, 1950 |
| 2,543,676 | Thayer et al. | Feb. 27, 1951 |
| 2,548,449 | Staub | Apr. 10, 1951 |
| 2,550,106 | Coltman et al. | Apr. 24, 1951 |
| 2,580,544 | Herzog | Jan. 1, 1952 |